United States Patent [19]

Nobile et al.

[11] Patent Number: 5,115,330
[45] Date of Patent: May 19, 1992

[54] LIQUID CRYSTAL WRITING SLATE
[75] Inventors: Frederick E. Nobile, DePere; John F. Harris, III, Franksville; Gary S. Silverman, Racine; Richard A. Baumann, Franksville, all of Wis.
[73] Assignee: Western Publishing Company, Racine, Wis.
[21] Appl. No.: 566,105
[22] Filed: Aug. 9, 1990
[51] Int. Cl.$^5$ .............. G02F 1/133; G09G 3/02; G09G 3/36; G08C 21/00
[52] U.S. Cl. .................................. 359/52; 359/74; 359/83; 359/84; 340/706; 340/784; 178/18
[58] Field of Search ............ 340/784 US, 712 US, 340/706; 350/339 R; 341/33 US, 32 US; 359/46 US, 51 US, 52 US, 62 US, 74 US, 83 US, 84 US, 85 US; 178/18, 19, 20

[56] References Cited

U.S. PATENT DOCUMENTS

| Re. 28,515 | 8/1975 | Altman | 430/14 |
|---|---|---|---|
| 2,346,675 | 4/1944 | Hackenberg | 346/1.1 |
| 3,439,525 | 4/1969 | Waterman et al. | 374/5 |
| 3,671,231 | 6/1972 | Haas et al. | 430/19 |
| 3,673,593 | 6/1972 | Kaye et al. | 346/155 |
| 3,775,757 | 11/1973 | Taylor et al. | 365/108 |
| 3,781,085 | 12/1973 | Leibowitz | 350/336 |
| 3,852,092 | 12/1974 | Patterson et al. | 428/1 |
| 3,886,311 | 5/1975 | Rodgers et al. | 178/18 |
| 3,894,793 | 7/1975 | Haas | 430/20 |
| 3,947,183 | 3/1976 | Haas et al. | 350/346 |
| 3,979,743 | 9/1976 | Moore | 340/784 |
| 4,040,047 | 8/1977 | Hareng et al. | 365/126 |
| 4,042,293 | 8/1977 | Hanak et al. | 350/336 |
| 4,048,358 | 9/1977 | Shanks | 428/1 |
| 4,060,654 | 11/1977 | Quenneville | 428/1 |
| 4,165,923 | 8/1979 | Janning | 350/341 |
| 4,217,160 | 8/1980 | Perregaux | 156/239 |
| 4,221,471 | 9/1980 | Gurtler | 350/331 R |
| 4,232,084 | 11/1980 | Tate | 428/321.5 |
| 4,370,194 | 1/1983 | Shaver et al. | 156/643 |
| 4,405,993 | 9/1983 | Kahn et al. | 365/108 |
| 4,433,900 | 2/1984 | Sakimura | 350/331 R |
| 4,435,047 | 3/1984 | Fergason | 350/334 |
| 4,494,824 | 1/1985 | Nakamura et al. | 350/334 |
| 4,525,032 | 6/1985 | Hilsum | 350/331 R |
| 4,527,862 | 7/1985 | Arakawa | 350/334 |
| 4,536,014 | 8/1985 | Boutaleb et al. | 283/83 |
| 4,606,611 | 8/1986 | Fergason | 350/334 |
| 4,616,903 | 10/1986 | Fergason | 350/334 |
| 4,617,207 | 10/1986 | Ueki et al. | 428/1 |
| 4,643,528 | 2/1987 | Bell, Jr. | 350/334 |
| 4,671,618 | 6/1987 | Wu et al. | 350/347 V |
| 4,673,255 | 6/1987 | West et al. | 350/347 V |
| 4,685,770 | 8/1987 | Baeger | 350/344 |
| 4,685,771 | 8/1987 | West et al. | 350/347 V |
| 4,688,900 | 8/1987 | Doane et al. | 350/347 V |
| 4,692,779 | 9/1987 | Ando et al. | 346/153.1 |
| 4,693,557 | 9/1987 | Fergason | 350/331 R |
| 4,704,003 | 11/1987 | Komaki | 350/344 |
| 4,707,080 | 11/1987 | Fergason | 350/334 |
| 4,719,457 | 1/1988 | Kitajima et al. | 340/784 |
| 4,723,836 | 2/1988 | Kono et al. | 350/331 R |
| 4,728,547 | 3/1988 | Vaz et al. | 428/1 |
| 4,814,760 | 3/1989 | Johnston | 340/784 |
| 4,837,058 | 6/1989 | Aziawa et al. | 428/1 |
| 4,837,745 | 6/1989 | Eich et al. | 365/108 |
| 4,857,427 | 8/1989 | Itoh et al. | 430/19 |
| 4,873,398 | 10/1989 | Hubby, Jr. | 178/18 |
| 4,890,096 | 12/1989 | Taguchi et al. | 340/712 |
| 4,927,986 | 5/1990 | Daly | 178/18 |
| 4,931,019 | 6/1990 | Park | 434/409 |
| 4,947,156 | 8/1990 | Sato et al. | 340/707 |
| 4,973,800 | 11/1990 | Sindeband et al. | 178/18 |

FOREIGN PATENT DOCUMENTS 2145657A 4/1985 United Kingdom .

Primary Examiner—Stanley D. Miller
Assistant Examiner—Ron Trice
Attorney, Agent, or Firm—Jansson & Shupe, Ltd.

[57] ABSTRACT

A slate, such as a writing/drawing slate, includes a base supporting a laminate which has an LC-layer (liquid crystal layer) formed of polymeric material holding micro-volumes of liquid crystal material, a conductive layer on one surface of the LC-layer, and a substantially transparent protective overlayer on the other surface of the LC-layer, apparatus for transitory application of potential through the LC-layer to the conductive layer to produce an image on the image-displaying surface area, and apparatus secured to the base to facilitate erasing of the image. In preferred embodiments the other surface of the LC-layer is substantially conductor-free.

30 Claims, 6 Drawing Sheets

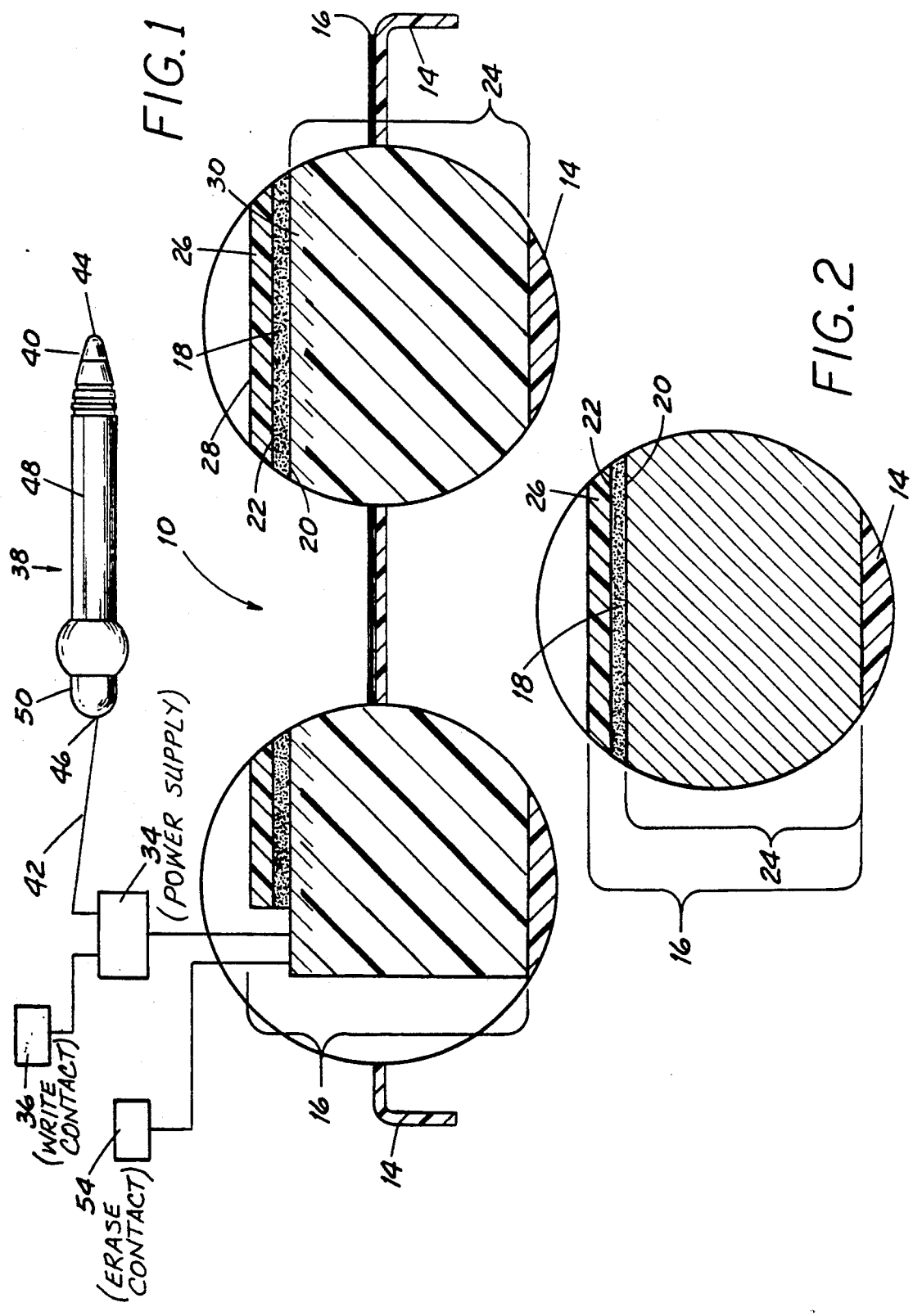

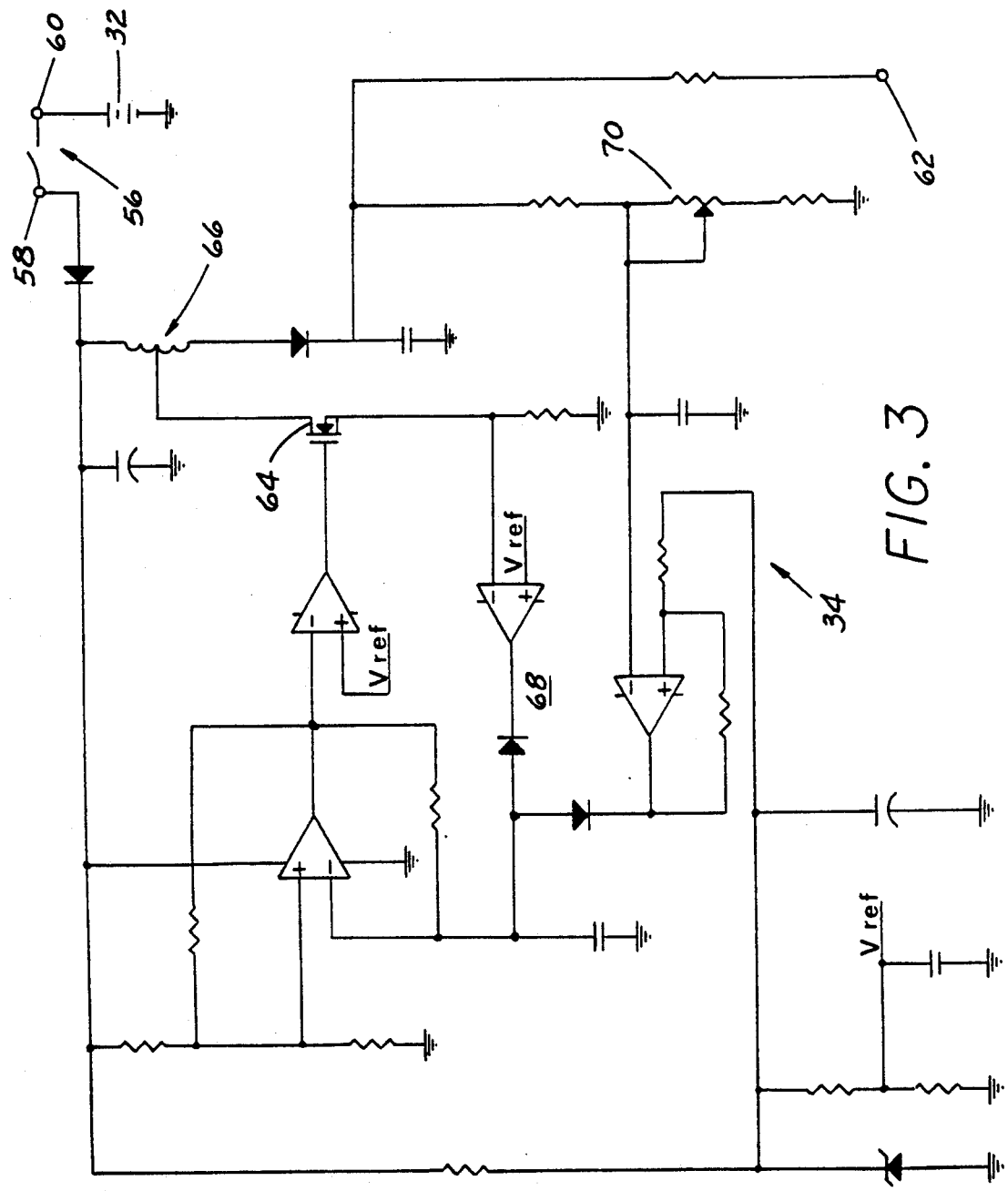

LIQUID CRYSTAL WRITING SLATE

RELATED APPLICATIONS

Related patent applications which are commonly-owned and filed concurrently herewith are as follows: Ser. No. 566,104, entitled "IMPROVED LIQUID CRYSTAL DISPLAY DEVICE," an application of Frederick E. Nobile, John F. Harris III, Gary S. Silverman and Richard A. Baumann; Ser. No. 566,103, entitled "LIQUID CRYSTAL DEVICE WITH IMPROVED LIGHT-TRANSMISSION RETENTION," an application of Frederick E. Nobile, John F. Harris III, and Gary S. Silverman; and Ser. No. 566,102, entitled "IMPROVED LIQUID CRYSTAL DISPLAY WITH DC IMAGING SYSTEM," an application of Frederick E. Nobile, John F. Harris III and Gary S. Silverman.

FIELD OF THE INVENTION

This invention is related generally to display and writing slates and, more particularly, to such slates of the liquid crystal type.

BACKGROUND OF THE INVENTION

Many different kinds of display and writing slates have been developed for various uses, including personal drawing and writing, blackboard-type presentations, games, etc. Slates have ranged from simple erasable chalkboards to various kinds of high-tech devices.

A few devices which might be characterized as slates have even utilized the light-modulating characteristics of liquid crystals to allow creation of images. Liquid crystal display devices, which are well known, depend, of course, upon the re-orientation of the liquid crystals in the presence of a field (for example, an electric field) to change visual characteristics or otherwise serve their purpose.

Such liquid crystal displays commonly employ spaced conductive lattice networks, single conductive planes with spaced conductive lattice networks, or pairs of conductive planes. Such arrangements have liquid crystal material between conductive networks and/or planes to apply the fields which create reorientation and the resulting images in the liquid crystal material.

Some devices of this type include those disclosed in U.S. Pat. Nos. 4,814,760 (Johnston et al.), U.S. Pat. No. 3,781,085 (Liebowitz), U.S. Pat. No. 4,685,770 (Baeger), U.S. Pat. No. 4,525,032 (Hilsum), and U.S. Pat. No. 3,947,183 (Haas et al.).

Some of such slates are equipped with writing instruments intended to change the polarization of a liquid crystal. However, devices of the prior art have a number of shortcomings and/or disadvantages when considered as writing/drawing slates for various purposes.

In some devices, it is not possible to obtain a solid continuous line. Some devices are very complex and expensive in construction and do not lend themselves to wide usage for writing/drawing usage, classroom usage, toy or game uses, or the like. Some, because of how they function, may unnecessarily limit the creative skills of the user; because they are point-, line-, or area-limited, they do not lend themselves to creation of artistic images, for example, of the type possible with devices such as brushes, pads, or even fingers of the hand.

Yet another disadvantage of certain devices of the prior art is the inability of such devices to hold an image for a sufficient duration. Liquid crystal images after removal of a potential-applying means tend to be fleeting. In addition, certain prior devices do not have simple, easily usable erasing means, for example, similar to blackboard erasers. Instead, erasing can be time-consuming.

A variety of light-modulating liquid crystal products have been made utilizing LC-layers which have a polymeric material forming and holding micro-volumes of liquid crystal material. However, LC-layers of this type have heretofore not been successfully utilized in simple slate products of the writing/drawing type.

An easily-erasable liquid crystal writing/drawing slate, which has great versatility in image creation, good image retention, and easy erasibility, and which is easily usable and inexpensive in construction would be an important advance in the art.

OBJECTS OF THE INVENTION

It is an object of this invention to provide a display and writing/drawing slate which overcomes some of the problems and shortcomings of the prior art.

Another object of this invention is to provide an improved slate which has great versatility in image creation.

Another object of this invention is to provide an improved liquid crystal writing/drawing slate which is easily usable and easily erasable.

Another object of this invention is to provide an liquid crystal slate with improved image retention after cessation of steps to apply an electric field.

Another object of this invention is to provide an improved liquid crystal slate which can readily lend itself to use by children for writing/drawing purposes and the like.

Another object of this invention is to provide an improved liquid crystal writing slate which is simple and inexpensive in construction.

Another object of this invention is to provide an improved liquid crystal slate device having an LC-layer formed of a polymeric material holding micro-volumes of liquid crystal material.

Another object of this invention is to provide an improved writing slate wherein the liquid crystal material may be polarized or de-polarized using a variety of implements including a stylus, a pad, a finger or a hand.

These and other important objects will be apparent from the descriptions of this invention which follow.

SUMMARY OF THE INVENTION

This invention is an improvement in writing slates of the type having an image-displaying area, means to form an image thereon and erasing means. This invention overcomes certain problems and shortcomings of the prior art, including those mentioned above. One way in which this invention overcomes such shortcomings relates to the unique way in which images are created and erased from the slate.

The invention includes: a base member; a laminate secured to the base and having an LC-layer (liquid crystal layer) of polymeric material forming and holding micro-volumes of liquid crystal material, a conductive layer on one surface (the first or bottom surface) of the LC-layer, and a substantially transparent protective overlayer on the other surface (the second or top surface); means secured to the base for selective transitory application of electrical potential through the LC-layer to the conductive layer to produce an image appearing at the image-displaying surface area; and means secured to the base to facilitate erasing of the image.

In preferred embodiments, the means for application of potential is a voltage source, most preferably a battery, a power supply electrically attached to such source for providing the electrical potential, and means for extending the potential from the power supply to the second surface of the LC-layer.

In a highly preferred embodiment, the potential extending means includes an applicator having a first conductive region for contact with the laminate and a flexible electrical cord connecting the applicator to the power supply. In an alternate embodiment, the applicator has no electrical connection to the slate (other than when applied thereto); instead, it has its own self-contained voltage source and power supply.

In certain preferred embodiments, the applicator is an elongate implement having a distal end and a proximal end. The first conductive region forms and extends from the distal end toward the proximal end, with a hand-hold region which is non-conductive positioned adjacent to the first conductive region. A flexible cord is attached to the implement at the proximal end.

The versatility of the slate is improved by the inclusion of a plurality of interchangeable conductive tips, such as a brush made of conductive fibers, a pointed stylus, or a blade-type tip. Any one of such tips may be connected to the first conductive region of the applicator and varying images may readily be formed by the use of such tips.

Electrical potential can be extended from the power supply to the second surface of the LC-layer in a variety of ways, using the applicator or otherwise. In certain embodiments of this invention, the applicator can have a second conductive region which is electrically joined to the first conductive region and thus to the power supply. Such second conductive region is positioned on the applicator so that a person's body in contact with it can extend the potential from the power supply to the second surface of the LC-layer. Electrical potential may also be extended to the second surface of the LC-layer through a person's body by contacting an exposed contact surface disposed on the base member beside the image-displaying surface. Such exposed contact surface, like the second conductive region described above, is connected to the power supply.

In preferred embodiments of this invention, the erasing means is an electrical pathway for short-circuiting the image-displaying surface to the conductive layer. Such pathway includes an erase-contact disposed on the base member adjacent to the image-displaying surface area. A person's body contacting the erase-contact forms a portion of the pathway. The pathway can also include a conductive pad held by a person for contacting the image-displaying surface and erasing the image in much the same fashion as a felt eraser is used to clear a blackboard.

In preferred embodiments, a base has a platform for supporting the laminate, a frame extending around the image-displaying surface, and an enclosure for the power supply. The frame serves to recess the image-displaying surface, thereby protecting such surface from physical damage. The base further includes a holster for storing the applicator when not in use and an enclosure for the battery.

The invention recognizes the creativity of the user in providing several ways in which such image-creating and erasing can be accomplished.

Further details of the inventive slate are set forth below in the detailed description.

BRIEF DESCRIPTION OF THE DRAWINGS

FIG. 1 is an edge elevation of a preferred display device in accordance with this invention, with portions enlarged and including a schematic diagram to show details.

FIG. 2 is an enlarged fragmentary edge elevation of a variation of the device of FIG. 1.

FIG. 3 is an electrical schematic diagram of one preferred form of electrical circuitry used in the device of this invention.

FIG. 10 is a partially cutaway side elevation of an alternative writing/drawing implement.

DETAILED DESCRIPTIONS OF PREFERRED EMBODIMENTS

Figure 4:
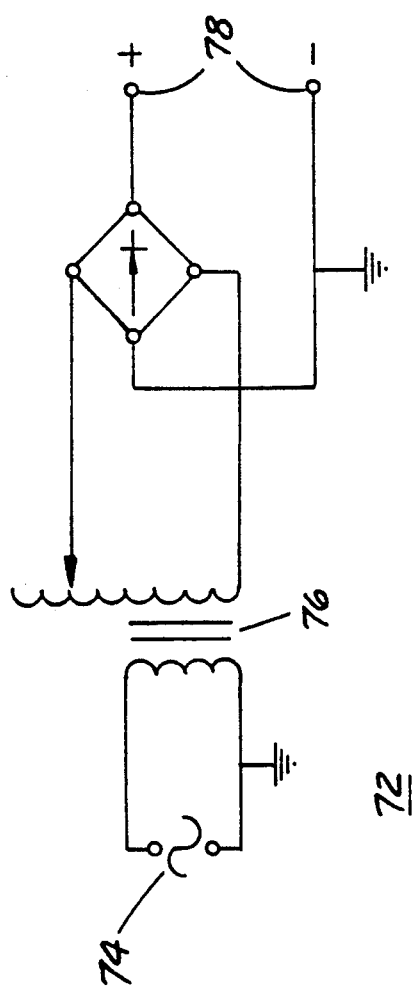
FIG. 4 is a simplified electrical schematic diagram of an alternative to the circuitry of FIG. 3.

The figures show an improved liquid crystal display device 10—a writing/drawing slate in accordance with this invention. In the figures, like parts are identified by like numerals.

As illustrated, display device or slate 10 includes a base member 12 forming a flat platform 14 on which a laminate 16 is supported. Laminate 16 is secured to platform 14 by a thin adhesive layer (not shown).

Laminate 16 has an LC-layer 18 (that is, a layer including liquid crystal material) with a bottom or first surface 20 and a top or second surface 22. Laminate 16 also has a conductive layer 24 in intimate contact with first surface 20 of LC-layer 18, and a transparent non-conductive protective overlayer 26 in contact with second surface 22. Laminate 16 has an image-displaying surface area 28.

LC-layer 18 is "switched" to provide either one of two light-modulating (that is, visual) characteristics. In one visual characteristic, LC-layer 18 is essentially transparent (light-transmissive) while in the other it is substantially opaque.

Images made by the contrast of the two different light-modulating characteristics of portions of LC-layer 18 appear at surface area 28. Before transitory application of electrical potential through a selected portion of LC-layer 18, the liquid crystal material at that portion of LC-layer 18 has a light-modulating characteristic (such as substantial opacity) limiting light transmissivity—by scattering and/or reflecting light. The transitory application of electrical potential through a selected portion of LC-layer 18 to underlying conductive layer 24 orients the liquid crystals at that portion of LC-layer 18 in one way, for example, such that the selected portion of LC-layer 18 becomes light-transmissive, a condition which persists until the liquid crystals of that portion of LC-layer 18 again assume orientations restoring the previous light-modulating characteristic.

LC-layer 18 is formed of a polymeric material holding micro-volumes of liquid crystal material. LC-layer 18 may be in various forms and made in various ways.

The micro-volumes of liquid crystal may be wholly separated from one another by the polymeric material of the LC-layer, or the micro-volumes (or some of them) may be interconnected to some extent. Particular processing methods for production of LC-layer 18 itself are not within the scope of this invention.

In preferred embodiments, LC-layer 18 is a material of the type known as a "polymer-dispersed liquid crystal." A so-called polymer-dispersed liquid crystal material is made from a solution which includes a polymeric material and a liquid crystal material. Micro-volumes of the liquid crystal material form in the polymeric material as the liquid crystal material emerges from solution during a solvent-evaporation and polymer-curing (cross-linking) process.

LC-layer 18 is preferably made by formation on conductive layer 24. In forming LC-layer 18 of a polymer-dispersed liquid crystal material, as preferred, a solution as mentioned above is flowed onto conductive layer 24 into a liquid coating of substantially even thickness. The coating may then be treated, for example, with heat and time, to evaporate the solvent and cure the polymer. This process causes the formation (by phase separation) therein of micro-volumes of the liquid crystal material. The use of solvents is not always necessary; in some cases liquid crystal may be solubilized in the polymeric material itself at high temperatures and then form micro-volumes in the polymeric material during a cooling process.

For the LC-layer, one alternative to the so-called polymer-dispersed liquid crystal materials is a liquid crystal and polymer material made from an emulsion subjected to a drying process. The emulsion includes a water-soluble polymer and a liquid crystal material, and forms what is sometimes referred to as a liquid crystal encapsulation. Like the preferred polymer-dispersed liquid crystal materials, such liquid crystal encapsulations are polymers holding micro-volumes of liquid crystal.

Whatever formation process is used, the polymeric and liquid crystal materials used in forming LC-layer 18 are selected to provide extended image retention after cessation of transitory application of electrical potential through LC-layer 18 to conductive layer 24.

In keeping with this objective, the polymeric material of LC-layer 18 is preferably a polymer of the type having a high electrical resistivity. In preferred embodiments the polymeric material has a resistivity of at least $10^{15}$ ohm-centimeters. With such a polymeric material, and an appropriate choice of liquid crystal material, the image on the image-display surface is retained for a substantial period after cessation of the transitory application of electrical potential through LC-layer 18.

The polymeric material is preferably selected from the polyvinyl acetates, acrylics and urethanes, and other polymeric materials having similar light-transmissive and high electrical resistivity. The most highly preferred polymeric materials are acrylic resins.

The liquid crystal material is preferably a nematic liquid crystal substance selected from cyanobiphenyls, cyanoterphenyls, cyanophenylcyclohexanes, cyclohexyphenyl pyrimidines, phenylpyrimidines, alkylbenzoates, other liquid crystal materials having similar properties, and mixtures of such materials. Suitable liquid crystal materials are commercially available from Hoffmann LaRoche (such as ROTN 132, 520, 711 and 3520) and E. Merck Chemical Company (such as E-7, E-201 and ZLI-1253), each of such liquid crystal materials being mixtures.

The ratios of polymeric material to liquid crystal material can vary widely—for example from about 1:2 to about 2:1. In highly preferred embodiments, LC-layer 18 includes at least 50% of the polymeric material and less than 50% of the liquid crystal material by weight of LC-layer 18. It has been found that decreasing the amount of liquid crystal material relative to polymeric material in the LC-layer actually yields images which last longer after transitory application of electrical potential ceases. In certain preferred embodiments, LC-layer 18 is made up of at least about 60% of the polymeric material and less than about 40% of the liquid crystal material by weight.

Image retention is significantly enhanced by using an LC-layer formed with more than about 50% polymeric material. If less is used, image retention is impaired. Image retention is further enhanced if the LC-layer has in excess of 60% polymeric material. However, it should be noted that when the amount of liquid crystal material relative to polymeric material is significantly decreased, it may be advisable for LC-layer 18 to be somewhat thicker to increase the opacity of LC-layer 18.

One preferred material for LC-layer 18 is made by combining two parts by weight of a 54% solids solution (in toluene) of Joncryl ™ 587 (a commercially-available hydroxyl-functional acrylic resin made by S. C. Johnson and Son, Inc., Racine, Wis.) with one part by weight of Hoffmann LaRoche ROTN-132 liquid crystal mix, to form a homogeneous solution. This solution is coated on conductive layer 24 and solvent evaporation forms a white LC-layer usable in this invention, ranging from somewhat translucent to substantially opaque depending on thickness. 52% of the resulting LC-layer is of an acrylic polymer, with 48% being liquid crystal material.

Another material for LC-layer 18 is made by forming a homogeneous solution using four parts by weight of a 40% solids solution (in ethyl acetate and toluene) of a hydroxy-functional polyvinyl acetate (such as ASB 516 from Air Products and Chemicals, Inc.) with one part of Hoffmann LaRoche ROTN-570 liquid crystal mix. This solution was applied to a conductive layer (such as the metallized side of a metallized polyester film). In a solvent-evaporation/polymer-curing process, a tack-free white layer was formed, ranging from somewhat translucent to substantially opaque. The resulting LC-layer has 62% polymer and 38% liquid crystal material.

Those areas of the LC-layers described above through which a transitory electrical potential was applied become transparent upon and after such application, by virtue of molecular orientation of the liquid crystals. With appropriate application of potential (e.g., about 900 volts at about 9 microamperes), the images created by such liquid crystal transparency persist for several minutes.

A great many other variations in LC-layer formulation and production method are possible. With such variations, and/or with variations in voltage application, the image can persist for many hours, in some cases even for more than one full day.

Conductive layer 24 may be in a variety of forms and made of a variety of materials. In one preferred form, conductive layer 24 is a thin metal sheet (foil) or a relatively rigid metal plate. This is illustrated by FIG. 2. Conductive layer 24 may also be a non-conductive sheet with a conductive surface material 30 thereon, such as a metallized surface or other conductive coating applied thereto. See FIG. 1, illustrating one such highly preferred form. When using such materials, the metallized or other conductive surface material is preferably in contact with first surface 20 of LC-layer 18. In one highly preferred example, conductive layer 24 is made of a non-conductive polyester film which is metallized on one surface. Such metallized polyester film may have a thickness on the order of 0.180 mm.

Conductive coatings also include some available in paint and pigment form. One form of conductive coating is a conductive ink, which allows ready printing for a variety of image-making purposes.

Conductive layer 24 may be made using a transparent non-conductive sheet to which a transparent conductive material, such as indium tin oxide (ITO), a transparent ink or other substance, or a very thin coating of a metal (such as aluminum or gold), is applied. The resulting conductive layer is transparent, which allows all layers of laminate 16 (conductive layer 24, LC-layer 18, and overlayer 26) to be transparent. A variety of interesting uses may be made of such transparent laminate.

While it is preferred that a conductive surface of the conductive layer be in contact with first surface 20 of LC layer 18, in some cases a non-conductive surface of the conductive layer may be in contact with first surface 20, and/or an additional layer which is non-conductive may be between conductive layer 24 and first surface 20. In such cases, applied voltage may need to be at somewhat higher levels.

In preferred embodiments, laminate 16 includes not just conductive layer 24 and LC-layer 18, but overlayer 26. As previously mentioned, overlayer 26 serves to protect LC-layer 18 from physical damage which can occur during careless writing and drawing, or from other abuse. Overlayer 26, which is in intimate contact with second surface 22 of LC-layer 18, is non-conductive so that second surface 22 is substantially conductor-free.

Preferred non-conductive overlayers are transparent and have a thickness on the order of 0.0002-0.002 inch (0.0051-0.051 mm), with 0.0005 inch (0.0128 mm) being highly preferred. A highly preferred material for overlayer 26 is polyester.

Overlayer 26, as previously noted, may be secured to second surface 22 by an adhesive, such as a polyurethane adhesive. In some cases, however, an adhesive is not required; sufficient retention of overlayer 26 on second surface 22 is accomplished by thermal bonding between the layers.

Regardless of whether laminate 16 has an overlayer, second surface 22 of LC-layer 18 is preferably substantially conductor-free. Image-displaying surface area 28 may have identifiers such as numerals, graph lines, axis markers or the like formed of conductive material. In some cases minimal conductive materials may be on the overlayer at a position away from contact with second surface 22. However, LC-layer 18, on what can be referred to as its image-accepting region (that is, the area of LC-layer 18 to which a stylus or other applicator, as described, applies by its motions variable images of any sort), is free of a fixed conductor on a second surface 22 which would serve an image-applying function with regard to such variable images. The term "conductor-free" refers to the fact that the liquid crystal display, at least along the aforesaid image-accepting region, is not of a type including a standard sandwich of liquid crystal material between conductive layers.

It has been found that overlayer 26, or more accurately an appropriate choice of material for overlayer 26, not only protects LC-layer 18, but such overlayer also significantly improves the time of image retention (after cessation of transitory application of potential) over the retention times in embodiments not including such overlayer. The precise reason for improved image retention times is not known; however, overlayer 26, in conjunction with the other layers, may act as an improved multi-layer capacitor after transitory application of potential ends.

The devices of this invention have image retention times which are significantly extended when compared to the teachings of the prior art. Durations which are achieved in the devices of this invention are more than adequate for a number of information display devices, including children's slates, blackboard-like lecture-room displays, and a variety of other devices.

In preferred embodiments, laminate 16 includes means for inhibiting (blocking) the passage of ultraviolet light. The inhibiting means is applied to LC-layer 18 and serves to extend substantially the useful life of display device 10 despite substantial exposure of laminate 16 to sunlight and/or other ultraviolet light. Permanent destructive effects of the light-modulating functions of LC-layer 18 are avoided and product life extended.

The ultraviolet-inhibiting means may be applied to LC-layer 18 in various ways. In one preferred embodiment, an ultraviolet-inhibiting substance was applied in making overlayer 26 such that it was substantially homogeneous therein. Incorporation of the inhibiting means into overlayer 26 may be before overlayer 26 is applied to second surface 22 of LC-layer 18. One preferred material for overlayer 26 is a polyester material known as "UV Absorber Film," available from Transilwrap, of Chicago, Ill., which has an ultraviolet-inhibiting (blocking) composition incorporated therein. One alternative is an separate layer forming a portion of overlayer 26. Another alternative is to incorporate an ultraviolet-inhibiting composition in an adhesive layer. Another alternative is to incorporate an ultraviolet-inhibiting composition in an adhesive layer.

As shown in the figures, slate 10 has means secured to base member 12 for selective transitory application of electrical potential through LC-layer 18 to conductive layer 24 to produce an image appearing at image-displaying surface area 28. Slate 10 also has means secured to base 12 to facilitate erasing of the image.

As shown in FIGS. 1 and 3, the means for transitory application of electrical potential includes a battery 32, to serve as voltage source, a power supply 34 electrically attached to battery 32, and means for extending the potential from power supply 34 to second surface 22 of LC-layer 18.

One preferred extending means includes a conductive exposed contact surface 36 which is electrically connected to power supply 34. A user who contacts exposed surface 36, such as with a hand or finger, can extend the potential from power supply 34 to second surface 22 of slate 10 by drawing or writing on laminate 16 with a finger of his other hand.

Another preferred means for extending the potential from power supply 34 to second surface 22 includes an applicator 38. Applicator 38 has a first conductive region 40 for contact with laminate 16 and a flexible electrical cord 42 which electrically connects applicator 38 to power supply 34.

In one highly preferred embodiment shown in the drawings, applicator 38 is an elongate implement with a distal end 44 and a proximal end 46. First conductive region 40 forms and extends from distal end 44 toward proximal end 46. A non-conductive hand-hold region 48 is positioned adjacent to first conductive region 40. Electrical cord 42 is attached to applicator implement 38 at proximal end 46. Applicator implement 38 is a stylus for writing and drawing on image-displaying surface 28 of slate 10.

Applicator 38 also has a second conductive region 50 which is electrically joined to first conductive region 40 and positioned such that hand-hold region 48 extends between first and second conductive regions 40 and 50. Such regions are electrically connected together by a wire or solid bar extending therebetween inside hand-hold region 48. Instead of writing or drawing in the normal manner, second conductive region 50 can be held by a user in one hand to allow the user to write or draw with the fingers of his other hand. Second conductive region 50 is an alternative to exposed contact surface 36.

As shown in the figures, slate 10 includes means to facilitate erasing of images produced as described above. The erasing means, which is an electrical pathway for short-circuiting image-displaying surface 28 to conductive layer 24, includes an erase-contact 54 electrically joined to conductive layer 24 and positioned for engagement by the hand of a user so that the other hand, or a conductive member held in such other hand, can be applied to surface area 28 in an erasing motion. Thus, a person's body forms a portion of the electrical pathway which shorts surface 28 to conductive layer 24.

As explained above, images may be formed on the liquid crystal display of this invention by selective transitory application of DC electrical potential through LC-layer 18 to conductive layer 24. Since second surface 22 of laminate 16 is substantially conductor-free, the application of DC electrical potential forms images without degradation of the laminate, as occurs when DC is applied in a laminate including an indium tin oxide transparent conductive layer.

DC is highly preferred because its use avoids what might be called "zebra striped" images of non-uniform intensity. To put it differently, DC electrical potential produces images of uniform intensity independent of the application method, that is, independent of whether such potential is applied to surface area 28 without surface-crossing motion, with slow surface-crossing strokes, or with very rapid strokes.

FIG. 3 illustrates the circuitry of DC power supply 4, as used in this invention. Power supply 34 is of the flyback type. It utilizes battery 32. Power supply 34 includes an optional switch 56, connected between terminals 58 and 60, which serves to turn power supply 34 on and off. The output voltage available at output terminal 62 is preferably determined and set to provide acceptable slate operation accommodating various factors, such as the thickness of LC-layer 18, the thickness of overlayer 26, the materials for the various layers, etc.

A preferred output voltage from a power supply is within the range of about 150–2000 volts DC. For a laminate without an overlayer, the lower portion of this range should suffice. With overlayer 26 in place, a preferred output voltage range is about 300–2000 volts DC. For polyester overlayers having a preferred thickness range of about 0.0002–0.002 inch (0.0051–0.051 mm), output voltage is preferably within the range of about 500–1200 volts DC.

Power supply 34 operates by rapidly switching MOSFET 64 to induce a voltage in both portions of an inductor 66. These voltages are rectified, filtered and directed to output terminal 62. A regulator network 68 maintains the output voltage within a relatively narrow range as selected and set using resistor 70.

Referring next to FIG. 4, a power supply 72 in the form of an AC-to-DC converter is shown. Such converter has an AC input 74 (for example, 120 V–60 Hz), and an output voltage as described above. The transformer 76 is preferably a high-permeability type autotransformer to permit selection of the appropriate output voltage, which appears at terminals 78.

It should be appreciated that, in both FIG. 3 and FIG. 4, those points identified by the ground symbol are electrically connected directly or indirectly to one another and to conductive layer 24. It is also to be appreciated that a negative rather than a positive potential can be used for image creation. In yet another variation, a voltage (positive or negative) is applied to the conductive layer and a person's body, contacting the image-displaying surface area (through a finger or hand-held conductive implement) and no other portion of the device, functions as a ground and creates an image. All of the imaging techniques disclosed herein are means for extending potential from a power supply to the second surface of the LC-layer.

In both of the illustrated power supplies, the output current is within the range of about 1–10 microamperes at the elevated output voltage. Furthermore, the power supplies are current-limited to a maximum output current of 10 microamperes.

Another voltage source is a piezoelectric generator which, for example, may be located in an applicator or elsewhere in the display device.

Figure 5:
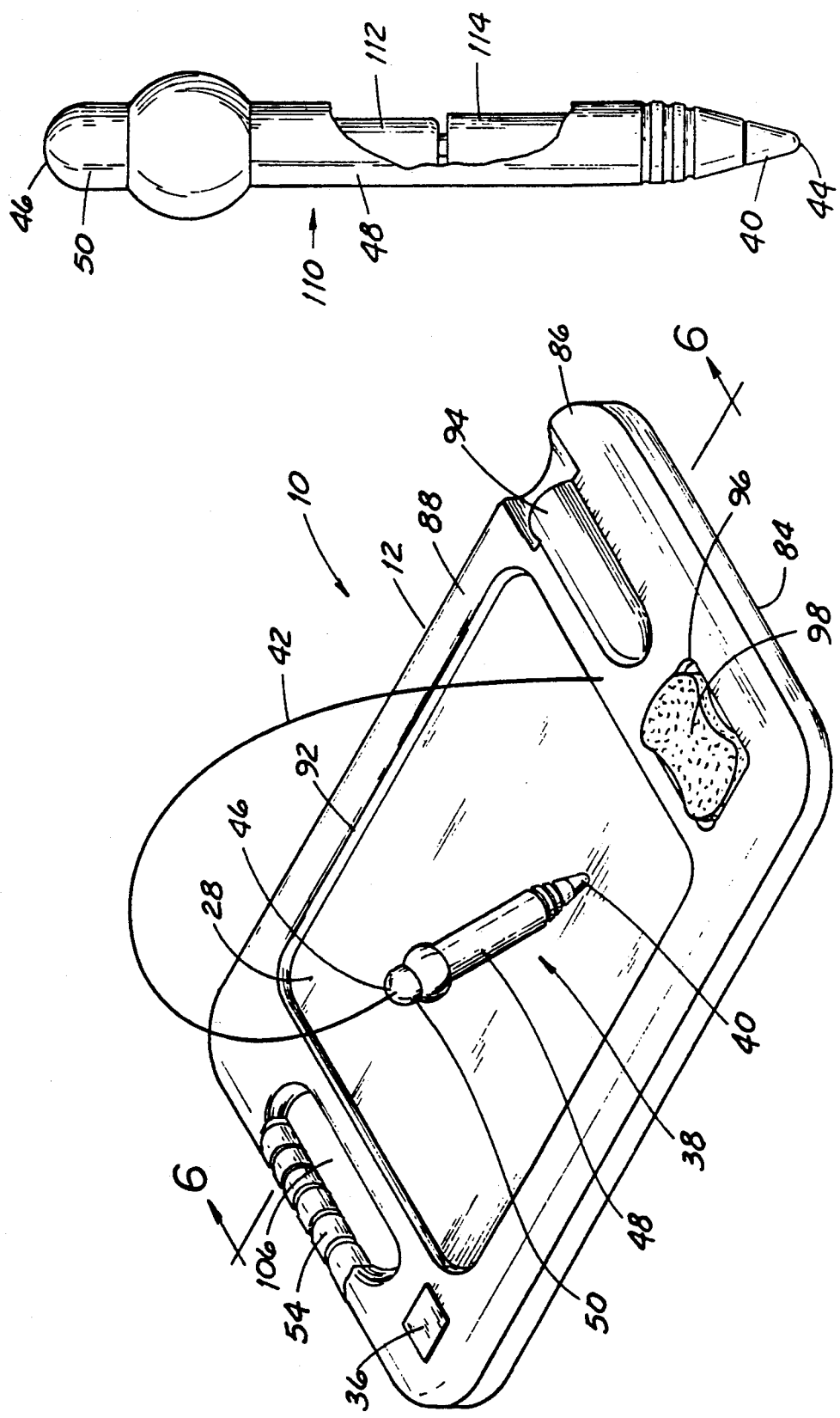
FIG. 5 is a perspective view of a writing/drawing slate in accordance with this invention.
Figure 6:
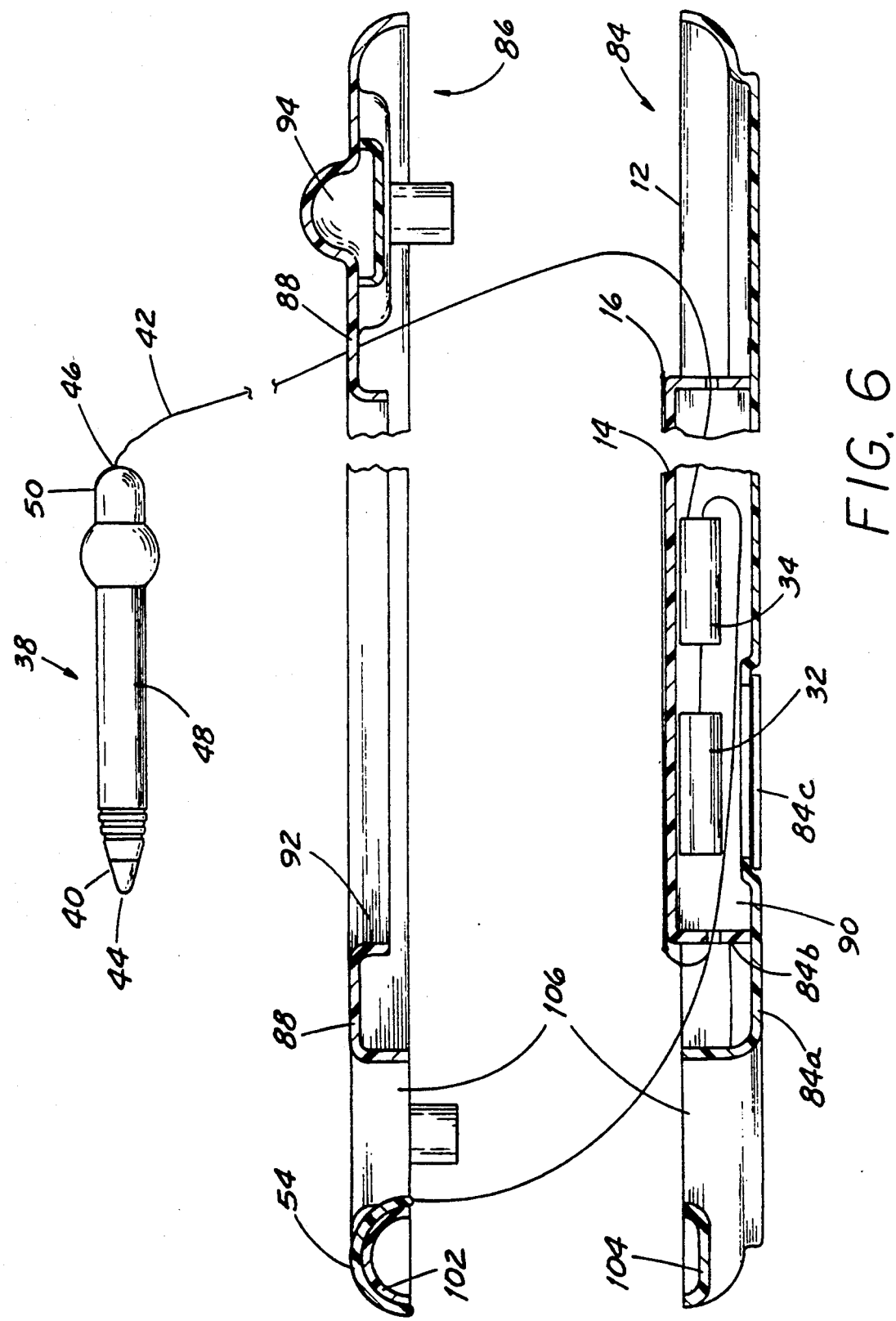
FIG. 6 is a partially exploded cross-sectional view taken along the viewing plane 6—6 as indicated in FIG. 5.

Further structural information on this invention is provided in FIGS. 5–10. FIGS. 5 and 6 illustrate complete slate 10, a highly preferred embodiment of the invention, in greater detail.

Base member 12 is formed by lower and upper shaped plastic members 84 and 86 (see FIG. 6), which are joined together along common edges. Lower and upper members 84 and 86 are preferably vacuum-formed polypropylene or styrene. In addition to platform 14 for supporting laminate 16, base member 12 forms a frame 88 around image-displaying surface 28 and forms an enclosure 90 for battery 32 and power supply 34.

Frame 88 is part of upper member 86 and platform 14 is on lower member 84. Frame 88 includes a downwardly extending lip 92 which coacts with platform 14 to help retain laminate 16 in its adhesive securement to platform 14. Frame 88 provides a recess for image-displaying surface 28 which aids in protecting laminate 16 from physical damage.

Lower member 84 includes a tray portion 84a and a platform portion 84b which rests on tray portion 84a. Enclosure 90 for battery 32 and power supply 34 is underneath platform portion 84b. A rectangular opening, which is closed by a sliding cover 84c, is formed in tray portion 84a to allow access to battery 32 for replacement purposes.

Upper member 86 forms a holster 92 adjacent to frame 88 Holster 92 is a tube-like formation used for storing applicator 38 when it is not in use. Upper member 86 also forms a shallow cavity 96 which receives and stores a conductive pad 98 when such pad is not in use. A preferred material for conductive pad 98 is carbon-filled foam.

Adjacent to frame 88 and along one edge of base member 12, upper member 86 of base 12 has an elongate upwardly-convex portion 102 and lower member 84 has an elongate downwardly-convex portion 104. As illustrated best in FIG. 6, erase-contact 54 is in the form of a substantially semi-cylindrical conductive member overlying and secured to convex portion 102.

Convex portions 102 and 104, joined together, and semi-cylindrical erase-contact 54, are immediately adjacent to an elongate slot 106 in base member 12. Together these parts form a convenient carrying handle for slate 10, as illustrated best in FIG. 5. Convex portion 104, at its lowest portion, is spaced somewhat above the plane of the surface on which the device is resting to define a space through which the fingers may be inserted when grasping the carrying handle. Erase-contact 54, as previously noted, is held by the user in one hand during erasing operations.

Referring now in greater detail to laminate 16, LC-layer 18 is preferably made by formation thereof on conductive layer 24. Conductive layer 24 may be unrolled onto a table to receive the liquid from which LC-layer 18 is formed. For an LC-layer 18 of polymer-dispersed liquid crystal material, as preferred, a solution including a polymeric material and a liquid crystal material is flowed onto conductive layer 24 into a coating of substantially even thickness. The coated conductor layer is then passed through an oven until the liquid solidifies by solvent evaporation. A preferred thickness for LC-layer 18 is about 0.00025 inch (0.00635 mm). Further curing (for example, for 24 hours) may be while the web, including conductive layer 24 and the formative LC-layer 18 thereon, is coiled into a roll.

Following curing, a very thin layer of adhesive (not shown) is applied to second surface 22 of LC-layer 18. Overlayer sheet 26 is then placed thereon and squeegeed. The resulting laminate is then die-cut to the desired size, suitable for placement on platform 14 and attachment thereto.

The device of this invention may be operated, as already indicated above, in the following manner:

After energizing power supply 34 by closing switch 56, an image may be made to appear at image-displaying surface area 28 by contacting such area with first conductive region 40 of applicator 38, in writing or drawing motions. Alternatively, images may also formed by a person's body, such as by contacting surface area 28 with the finger of one hand while the other hand is contacting exposed contact surface 36 or second conductive region 50 (or, for that matter, first conductive region 40). Images are formed by the liquid crystals in LC-layer 18 assuming a light-transmissive orientation, and such images last well after cessation of the transitory application of potential.

To erase images, the user touches erase-contact 54, typically with one hand, and simultaneously touches the surface area with a finger or fingers of the other hand, or with conductive pad 98 held in such hand. This shorts surface area 28 to conductive layer 24.

The device of this invention may also be used in the following manner to create and erase "reverse" images:

While contacting second conductive region 50 (or first conductive region 40 or exposed contact surface 36), a user can wipe across the entirety of surface area 28 using a hand or conductive pad 98. This brings all of u LC-layer 18 into a first light-transmissive visual characteristic. If the surface of conductive layer 24 which is in contact with first surface 20 of LC-layer 18 is reflective, as preferred for writing/drawing slates, the entire surface area will thereupon be mirror-like. In any event, conductive layer 24 is exposed. The user then contacts erase-contact 54 with one hand and simultaneously touches the displaying surface with a finger of the other hand (or a conductive implement held in such hand). This brings the contacted portions of image-displaying surface 8 to a second (opaque) visual characteristic. Thus, the image is the reverse of the images made in the manner previously described.

Figure 7:
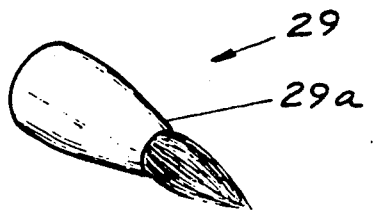
FIG. 7-9 are perspective views of interchangeable tips for a writing/drawing implement forming part of this invention.
Figure 8:
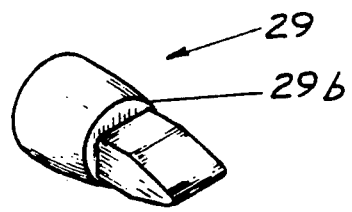
Figure 9:
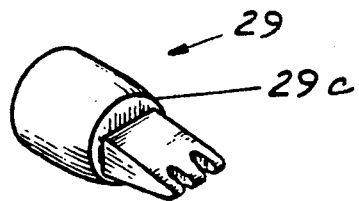

Referring to FIGS. 7-9, certain preferred slate combinations include additional means for a wider variety of creative expression. Such preferred combinations include a plurality of interchangeable conductive tips 29 for connection to first conductive region 40 of applicator 38. Merely as examples, such tips 29 may include a brush 29a having conductive fibers (see FIG. 7), a thin edge 29b (see FIG. 8), and a segmented edge 29c (see FIG. 9). Such tips 29 engage first conductive region 40 (or adjacent portions of applicator 38) by mechanical interference.

As used herein in describing writing/drawing and erasing on image-displaying surface 28, the term "contact" (in all its forms) means either to actually touch surface area 28 or to come in very close but non-touching proximity thereto. It is not necessary in many situations to actually touch such surface.

Referring again to the means for application of potential, FIG. 10 shows an untethered applicator 110 which is an alternative to applicator 38. Untethered applicator 110 is like applicator 38 in all respects, except that it has a self-contained battery 112 and power supply 114, and does not have any cord.

While the principles of this invention have been described in connection with specific embodiments, it should be understood clearly that these descriptions are made only by way of example and are not intended to limit the scope of the invention.

We claim:

1. In a slate of the type having an image-displaying surface area, means to form an image thereon, and erasing means, the improvement comprising:
    a base;
    a laminate secured to the base, said laminate having an LC-layer with first and second surfaces and formed of polymeric material holding microvolumes of liquid crystal material, a conductive layer along the first surface, and a substantially transparent protective overlayer on the second surface;
    image-application means movably secured to the base apart from said laminate for selective transitory application of electrical potential directly from the image-application means through the LC-layer to the conductive layer to cause an image appearing at the image-displaying surface area; and means secured to the base for draining the electrical potential between the image-displaying surface and the conductive layer to erase the image.

2. The slate of claim 1 wherein the means for application of potential comprises:
    a voltage source;

power supply means electrically attached to the voltage source for providing said electrical potential; and means for extending the potential from the power supply to the second surface.

3. The slate of claim 2 wherein the extending means comprises:

an applicator having a first conductive region for contact with the laminate; and a flexible electrical cord connecting the applicator to the power supply.

4. The slate of claim 3 wherein the applicator comprises a non-conductive hand-hold region adjacent to the first conductive region.

5. The slate of claim 4 wherein:

the applicator is an elongate implement having a distal end and a proximal end;

the first conductive region forms and extends from the distal end toward the proximal end; and the cord is attached to the implement at the proximal end.

6. The slate of claim 5 further including a plurality of interchangeable conductive tips for connection to the first conductive region of the applicator.

7. The slate of claim 4 wherein the applicator has a second conductive region electrically joined to the first conductive region, said non-conductive hand-hold region being between the first and second conductive regions, whereby a person's body contacting the second conductive region can extend the potential from the power supply to the LC-layer second surface.

8. The slate of claim 2 wherein the extending means comprises an exposed surface electrically connected to the power supply, whereby a person's body contacting the exposed surface can extend the potential from the power supply to the second surface.

9. The slate of claim 8 wherein the exposed surface is connected to the power supply by a flexible electrical cord.

10. The slate of claim 8 wherein the exposed surface is disposed on the base adjacent to the image-displaying surface area.

11. The slate of claim 1 wherein the potential-draining means comprises an electrical pathway for short-circuiting the image-displaying surface to the conductive layer.

12. The slate of claim 11 wherein the electrical pathway includes an erase-contact disposed on the base adjacent to the image-displaying surface area, whereby a person's body contacting the erase-contact forms a portion of the electrical pathway.

13. The slate of claim 12 wherein the electrical pathway further includes a conductive pad for contact with the image-displaying surface.

14. The slate of claim 2 wherein the LC-layer second surface is conductor-free on or along an image-accepting region of the laminate and wherein the base comprises:

a platform for supporting the laminate;

a frame around the image-displaying surface; and an enclosure for the power supply.

15. The slate of claim 14 wherein the image-displaying surface is recessed in the frame, thereby protecting the image-displaying surface from physical damage.

16. The slate of claim 15 wherein the extending means comprises:

an applicator having a first conductive region for contact with the laminate; and a flexible electrical cord connecting the applicator to the power supply.

17. The slate of claim 16 wherein the base further includes a holster for storing the applicator when not in use.

18. The slate of claim 16 wherein the voltage source is a battery, said base having an enclosure thereof.

19. In a slate of the type having an image-displaying surface area, means to form an image thereon, and erasing means, the improvement comprising:

a base;

a laminate secured to the base, said laminate having an LC-layer with first and second surfaces and formed of polymeric material holding microvolumes of liquid crystal material, a conductive layer along the first surface, and a substantially transparent protective overlayer on the second surface;

image-application means apart from the laminate and movable with respect thereto for selective transitory application of electrical potential directly from the image-application means through the LC-layer to the conductive layer to cause an image appearing at the image-displaying surface area; and means secured to the base for draining the electrical potential between the image-displaying surface and the conductive layer to erase the image.

20. The slate of claim 19 wherein the means for application of potential comprises:

a voltage source;

power supply means electrically attached to the voltage source for providing said electrical potential; and means for extending the potential from the power supply to the second surface.

21. The slate of claim 20 wherein the extending means comprises an applicator having a first conductive region for contact with the laminate.

22. The slate of claim 21 wherein the applicator comprises a non-conductive hand-hold region adjacent to the first conductive region.

23. The slate of claim 22 wherein:

the applicator is an elongate implement having a distal end and a proximal end; and the first conductive region forms and extends from the distal end toward the proximal end.

24. The slate of claim 22 wherein the applicator has a second conductive region electrically joined to the first conductive region, said non-conductive hand-hold region being between the first and second conductive regions, whereby a person's body contacting the second conductive region can extend the potential from the power supply to the LC-layer second surface.

25. The slate of claim 20 wherein the extending means comprises an exposed surface electrically connected to the power supply, whereby a person's body contacting the exposed surface can extend the potential from the power supply to the second surface.

26. The slate of claim 19 wherein the potential-draining means comprises an electrical pathway for short-circuiting the image-displaying surface to the conductive layer.

27. The slate of claim 26 wherein the electrical pathway includes an erase-contact disposed on the base adjacent to the image-displaying surface area, whereby a person's body contacting the erase-contact forms a portion of the electrical pathway.

28. The slate of claim 20 wherein the LC-layer second surface is conductor-free on or along an image-accepting region of the laminate and wherein the base comprises:
   a platform for supporting the laminate;
   a frame around the image-displaying surface; and
an enclosure for the power supply.

29. The slate of claim 28 wherein the image-displaying surface is recessed in the frame, thereby protecting the image-displaying surface from physical damage.

30. The slate of claim 29 wherein the voltage source is a battery, said base having an enclosure therefor.

* * * * *

UNITED STATES PATENT AND TRADEMARK OFFICE
CERTIFICATE OF CORRECTION

PATENT NO. : 5,115,330
DATED : May 19, 1992
INVENTOR(S) : Frederick E. Nobile, John F. Harris III,
Gary S. Silverman and Richard A. Baumann It is certified that error appears in the above-identified patent and that said Letters Patent is hereby corrected as shown below:

In column 5, line 20, "24" should be flush with the left margin, and not the start of a new paragraph.

In column 7, line 64, change "on a" to --on--.

In column 9, line 54, change "4" to --34--.

In column 10, line 67, after "88" insert --.--.

In column 12, line 2, change "you LC-layer" to --LC-layer--.

In column 12, line 12, change "8" to --28--.

In claim 18, line 2, change "thereof" to --therefor--.

Signed and Sealed this

Tenth Day of August, 1993

Attest:

MICHAEL K. KIRK

Attesting Officer     Acting Commissioner of Patents and Trademarks